US007055508B2

(12) United States Patent
Matsunaga et al.

(10) Patent No.: US 7,055,508 B2
(45) Date of Patent: Jun. 6, 2006

(54) EGR CONTROL DEVICE AND METHOD FOR INTERNAL COMBUSTION ENGINE

(75) Inventors: Akio Matsunaga, Susono (JP); Takao Fukuma, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/523,640

(22) PCT Filed: Aug. 11, 2003

(86) PCT No.: PCT/IB03/03258

§ 371 (c)(1),
(2), (4) Date: Feb. 4, 2005

(87) PCT Pub. No.: WO2004/015259

PCT Pub. Date: Feb. 19, 2004

(65) Prior Publication Data

US 2006/0048760 A1    Mar. 9, 2006

(30) Foreign Application Priority Data

Aug. 12, 2002 (JP) ............................. 2002-234429

(51) Int. Cl.
*F02M 25/07* (2006.01)
*G06F 19/00* (2006.01)
*F02M 51/00* (2006.01)

(52) U.S. Cl. .................................. 123/568.21; 701/108

(58) Field of Classification Search ................ 123/399, 123/568.16, 568.21–568.28, 478, 494; 701/103, 701/104, 105, 108
See application file for complete search history.

(56) References Cited

U.S. PATENT DOCUMENTS

| 5,201,303 | A |  | 4/1993 | Kojima ........................ 123/704 |
|---|---|---|---|---|
| 6,000,385 | A |  | 12/1999 | Fukuma ...................... 123/704 |
| 6,032,656 | A | * | 3/2000 | Itoyama et al. ......... 123/568.21 |
| 6,199,537 | B1 | * | 3/2001 | Kowatari et al. ............ 123/399 |
| 6,227,182 | B1 | * | 5/2001 | Muraki et al. .......... 123/568.21 |
| 6,230,697 | B1 | * | 5/2001 | Itoyama et al. ......... 123/568.21 |
| 6,321,732 | B1 | * | 11/2001 | Kotwicki et al. ....... 123/568.16 |

(Continued)

FOREIGN PATENT DOCUMENTS

JP      U 63-125160      8/1988

(Continued)

*Primary Examiner*—Willis R. Wolfe, Jr.
(74) *Attorney, Agent, or Firm*—Oliff & Berridge, PLC (57) ABSTRACT

An EGR control device is provided with an EGR control valve (52) and an electronic control unit (60). An exhaust gas recirculation pipe (51) extends across the EGR control valve (52). The electronic control unit calculates a target EGR ratio, a target air flow rate, an actual EGR ratio, and an actual air flow rate, on the basis of operational state quantities of an engine. The electronic control unit then calculates, as a target converted EGR ratio, a ratio of the target EGR ratio to the target air flow rate, calculates, as an actual converted EGR ratio, a ratio of the actual EGR ratio to the actual air flow rate, and controls an opening of the EGR control valve such that the target converted EGR ratio becomes equal to the actual converted EGR ratio. An actual converted EGR ratio is proportional to an intake-air oxygen concentration, and an actual converted EGR ratio and a target converted EGR ratio are calculated independently of a command injection amount. Therefore, a desired intake-air oxygen concentration is obtained irrespective of flow rate characteristics of injection valves.

18 Claims, 5 Drawing Sheets

U.S. PATENT DOCUMENTS

| | | | |
|---|---|---|---|
| 6,609,058 B1 * | 8/2003 | Russell et al. | 701/104 |
| 6,705,303 B1 * | 3/2004 | Itoyama et al. | 123/568.21 |
| 6,868,329 B1 * | 3/2005 | Ito et al. | 701/108 |
| 2001/0017126 A1 * | 8/2001 | Kowatari et al. | 123/399 |
| 2002/0129790 A1 * | 9/2002 | Kowatari et al. | 123/399 |
| 2002/0129800 A1 * | 9/2002 | Russell et al. | 123/568.16 |
| 2003/0075147 A1 * | 4/2003 | Kowatari et al. | 123/399 |

FOREIGN PATENT DOCUMENTS

| | | |
|---|---|---|
| JP | A 7-174048 | 7/1995 |
| JP | A 9-4519 | 1/1997 |
| JP | A 9-126060 | 5/1997 |
| JP | A 10-141147 | 5/1998 |
| JP | A 10-288043 | 10/1998 |

* cited by examiner

R ··· EGR RATIO
λ ··· AIR EXCESSIVENESS RATIO
R/λ ··· CONVERTED EGR RATIO
x ··· INTAKE-AIR OXYGEN CONCENTRATION
$L_0$ ··· THEORETICAL AIR AMOUNT PER UNIT FUEL AMOUNT ($Nm^3/kg$)
a ··· OXYGEN CONCENTRATION IN ATMOSPHERE
b ··· PRODUCTION AMOUNT OF $CO_2$ AND $H_2O$ PER UNIT FUEL AMOUNT ($Nm^3/kg$)
p, q ··· CONSTANTS

EGR CONTROL DEVICE AND METHOD FOR INTERNAL COMBUSTION ENGINE

BACKGROUND OF THE INVENTION

1. Field of the Invention

The invention relates to an EGR control device and method for an internal combustion engine.

2. Description of the Related Art

There has been known an EGR unit (an exhaust gas recirculation unit) that recirculates part of exhaust gas of an internal combustion engine into an intake passage. Such an EGR unit, which is designed to reduce an amount of nitrogen oxides (NOx) and the like that are discharged from an engine, is provided with an EGR gas passage through which an exhaust passage and an intake passage of the engine communicate with each other, and with an EGR control valve across which the EGR passage extends. By controlling an opening of the EGR control valve, a flow rate of EGR gas is controlled. Thus, an EGR ratio, which is a ratio of a flow rate of EGR gas sucked by the engine to a flow rate of gas sucked by the engine (cylinders) (i.e., a flow rate of the entire gas), is controlled.

An amount of NOx discharged from a diesel engine is closely correlated to a concentration of oxygen contained in gas flowing into cylinders of the engine (hereinafter referred to as an "intake-air oxygen concentration "x""). Accordingly, in order to reduce a discharge amount of NOx, it is effective to perform control such that the intake-air oxygen concentration "x" becomes equal to a predetermined concentration. In view of the foregoing, an internal combustion engine equipped with an EGR unit disclosed in Japanese Patent Application No. 10-141147 adopts a concept of converted EGR ratio so as to control an intake-air oxygen concentration "x", and controls an EGR control valve such that an actual converted EGR ratio becomes equal to a target converted EGR ratio.

That is, in the unit disclosed in Japanese Patent Application Laid-Open No. 10-141147 mentioned above, an air excessiveness ratio λ is defined as expressed by an expression (1) shown below. A converted EGR ratio SR is defined as a value obtained by dividing an EGR ratio R by the air excessiveness ratio λ (SR=R/λ). As is apparent from FIG. 5, there is established a relationship approximately expressed by an expression (2) shown below between the converted EGR ratio SR and the intake-air oxygen concentration "x".

Figure 5:
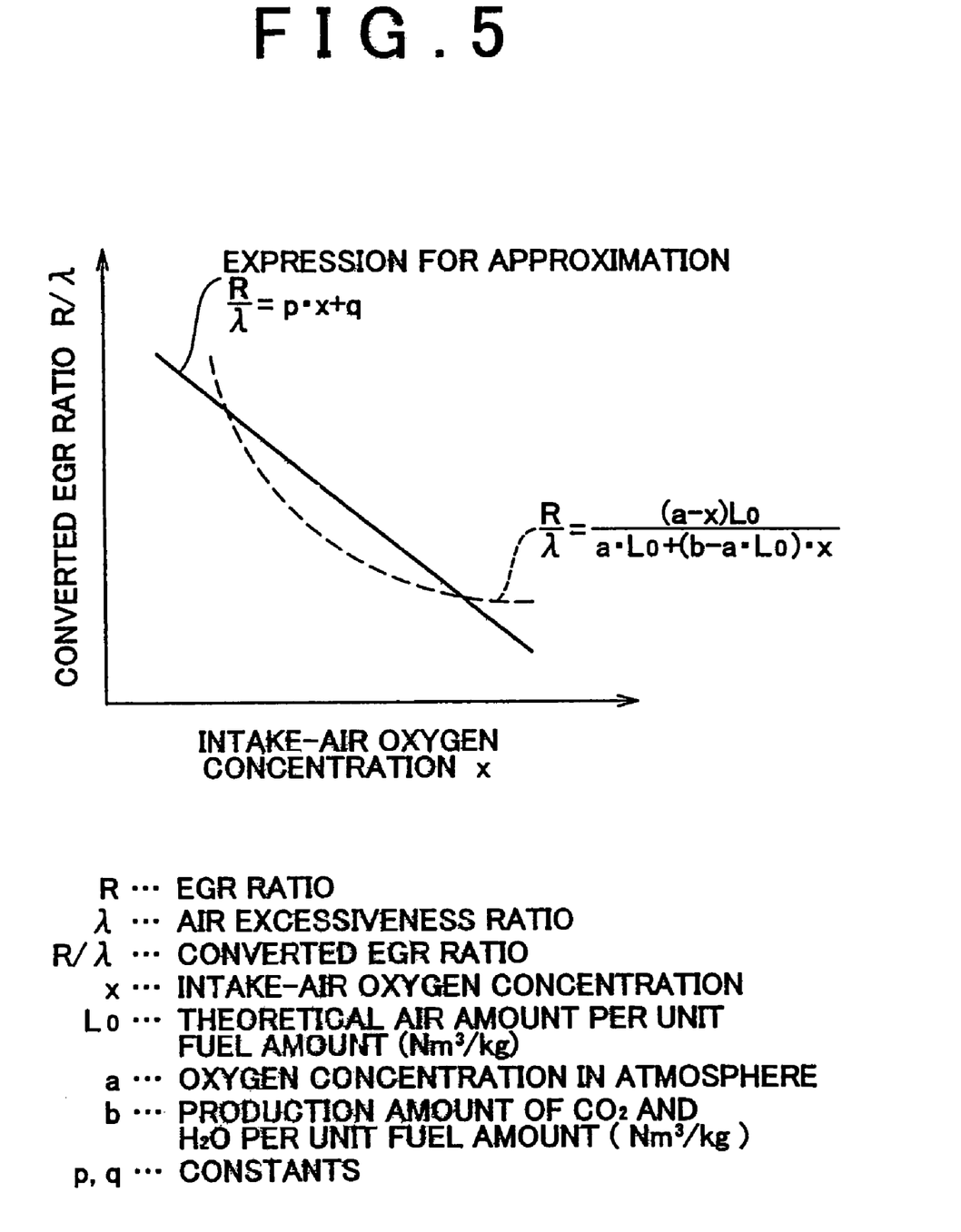
FIG. 5 is a graph showing a relationship between intake-air oxygen concentration and converted EGR ratio.

[Expression 1]

$$\lambda = k \times Gn/Q \quad (1)$$

k . . . constant

Gn . . . flow rate of air (fresh air) that is newly sucked into engine (cylinders)

Q . . . fuel injection amount per unit time

[Expression 2]

$$SR = R/\lambda \approx p \times x + q \quad (2)$$

p: negative constant, q: positive constant

Thus, as is understood from the aforementioned expression (2), the intake-air oxygen concentration "x" can be made equal to a suitable concentration by determining a target converted EGR ratio SRtgt as a target value of the converted EGR ratio SR on the basis of operational state quantities (e.g., a command injection amount Qfin and an engine rotational speed NE), calculating a true converted EGR ratio (an actual converted EGR ratio) SRact on the basis of the operational state quantities of the engine, and controlling an opening of the EGR control valve such that the actual converted EGR ratio SRact coincides with the target converted EGR ratio SRtgt. The aforementioned unit of the related art controls EGR ratio on the basis of the concept as described above, thus reducing a discharge amount of NOx.

In this case, the target converted EGR ratio SRtgt is determined, for example, on the basis of a map (a table) defining a relationship between command injection amount Qfin and engine operational state quantity as engine rotational speed NE on one hand and target converted EGR ratio SRtgt on the other hand, and on the basis of an actual command injection amount Qfin and an actual engine rotational speed NE. Further, an actual converted EGR ratio SRact is calculated on the basis of expressions (3) and (4) shown below.

In the expressions (3) and (4), Ract represents an actual EGR ratio, and Gn represents a flow rate of air (fresh air) that is actually sucked into the cylinders of the engine (hereinafter referred to as an "actual air flow rate Gn" or a "detected air flow rate Gn"). The flow rate of air (fresh air) is detected by an air flow meter. Further, Gcyl represents a flow rate of gas that is actually sucked into the cylinders of the engine (i.e., flow rate of the entire gas=flow rate of fresh air+flow rate of EGR gas). This flow rate (hereinafter referred to as a "cylinder inflow gas flow rate Gcyl") is determined on the basis of a map defining a relationship between intake pipe pressure PM and intake air temperature THA on one hand and gas flow rate Gcyl on the other hand, and on the basis of an actually detected intake pipe pressure PM and an actually detected intake air temperature THA.

Further, an air excessiveness ratio λ used in the expression (3) is calculated on the basis of the aforementioned expression (1). In this case, a fuel injection amount Q per unit time in the expression (1) cannot be measured directly and thus is calculated, for example, from an engine rotational speed NE and a command injection amount (a required injection amount) Qfin, which is determined on the basis of an accelerator operation amount Accp and the engine rotational speed NE.

[Expression 3]

$$SRact = Rac/\lambda \quad (3)$$

[Expression 4]

$$Ract = (Gcyl - Gn)/Gcyl \quad (4)$$

However, even if a drive signal has been delivered to an injector so that the command injection amount Qfin of fuel is injected therefrom, an actual fuel injection amount may not coincide with the command injection amount Qfin owing to differences among individual products of the injector or changes in performance of the injector during use thereof. Hence, the fuel injection amount Q per unit time in the aforementioned expression (1) may become imprecise, so that the air excessiveness ratio λ may become imprecise. Therefore, an actual converted EGR ratio SRact, which is based on the aforementioned expression (3), may not be calculated precisely. As a result, the true converted EGR ratio SRact does not coincide with the target converted EGR ratio SRtgt, and the intake-air oxygen concentration "x" cannot be made equal to a desired value "x". In some cases, therefore, an increase in discharge amount of NOx is caused.

DISCLOSURE OF THE INVENTION

It is an object of the invention to provide an EGR control device and method for an internal combustion engine which is capable of ensuring a desired intake-air oxygen concentration "x" and thus reducing a discharge amount of NOx even in the case where a command injection amount Qfin of fuel is not injected when a drive signal is delivered to an injector with a view to injecting the command injection amount Qfin of fuel therefrom.

The target converted EGR ratio SRtgt is determined, for example, on the basis of a command injection amount Qfin and an engine rotational speed NE as engine operational state quantities. Thus, if a target EGR ratio Rtgt is defined as a value Rtgt (Qfin, NE) that is determined on the basis of a command injection amount Qfin and an engine rotational speed NE and if a target air excessiveness ratio Xtgt is likewise defined as a value Xtgt (Qfin, NE) that is determined on the basis of a command injection amount Qfin and an engine rotational speed NE, a target converted EGR ratio SRtgt can be defined as a value that is determined on the basis of an expression (5) shown below.

[Expression 5]

$$SRtgt = Rtgt/\lambda tgt \quad (5)$$

Further, if a target air flow rate is defined as a value Gntgt (Qfin, NE) that is determined on the basis of a command injection amount Qfin and an engine rotational speed NE, a target air excessiveness ratio $\lambda$tgt can be calculated from the aforementioned expression (1), using an expression (6) shown below. An expression (7) shown below is obtained from the expression (6) and the aforementioned expression (5). It is to be noted in these expressions that k1 is a coefficient intended for coincidence between units or the like.

[Expression 6]

$$\lambda tgt = k1 \times Gntgt/Qfin \quad (6)$$

[Expression 7]

$$SRtgt = Rtgt \times Qfin/k1 \times Gntgt \quad (7)$$

On the other hand, an actual converted EGR ratio SRact is expressed by an expression (8) shown below, on the basis of the aforementioned expression (3) (SRact=Ract/$\lambda$) and the aforementioned expression (1) ($\lambda$=k×Gn/Q).

[Expression 8]

$$SRact = Ract \times Qfin/k1 \times Gn \quad (8)$$

A comparison between the aforementioned expression (7) and the aforementioned expression (8) reveals that the command injection amount Qfin and the coefficient k1 exist on the right side of each of the expressions and thus can be eliminated. Namely, in order to ensure coincidence between a target converted EGR ratio SRtgt and an actual converted EGR ratio SRact, it is appropriate that a post-conversion target converted EGR ratio SRhtgt expressed by an expression (9) shown below be equal to a post-conversion actual converted EGR ratio SRhact expressed by an expression (10) shown below.

[Expression 9]

$$SRhtgt = Rtgt/Gntgt \quad (9)$$

[Expression 10]

$$SRhact = Ract/Gn \quad (10)$$

The foregoing description illustrates a principle adopted by the EGR control unit for the internal combustion engine in accordance with the invention. As is apparent from the aforementioned expressions (9) and (10), if the EGR control valve is controlled on the basis of a target EGR ratio Rtgt, a target air flow rate Gntgt, an actual EGR ratio Ract, and an actual air flow rate Gn, a target converted EGR ratio can be made to coincide with an actual converted EGR ratio SRact, without using a command injection amount Qfin for calculations. As a result, a desired intake-air oxygen concentration "x" can be obtained, whereby it becomes possible to effectively reduce a discharge amount of NOx.

The EGR control device for the internal combustion engine in accordance with the invention, which is based on the concept described hitherto, is provided with an EGR passage through which an exhaust passage and an intake passage of the internal combustion engine communicate with each other, and with an EGR control valve across which the EGR passage extends and which controls a flow rate of EGR gas flowing from the exhaust passage to the intake passage. This EGR control device is characterized by comprising operational state quantity acquisition means, target EGR ratio determination means, target air flow rate determination means, actual EGR ratio acquisition means, actual air flow rate acquisition means, and EGR ratio control means. The operational state quantity acquisition means acquires an operational state quantity of the engine. The target EGR ratio determination means determines, on the basis of the detected operational state quantity, a target value of an EGR ratio, namely, a ratio of a flow rate of EGR gas sucked by the engine to a flow rate of gas sucked by the engine, as a target EGR ratio. The target air flow rate determination means determines, on the basis of the detected operational state quantity, a target value of a flow rate of air sucked by the engine, as a target air flow rate. The actual EGR ratio acquisition means acquires a true EGR ratio on the basis of the detected operational state quantity, as an actual EGR ratio. The actual air flow rate acquisition means acquires, on the basis of the detected operational state quantity, an actual flow rate of air sucked by the engine, as an actual air flow rate. The EGR ratio control means controls an actual EGR ratio by controlling an opening of the EGR control valve in accordance with the target EGR ratio, the target air flow rate, the actual EGR ratio, and the actual air flow rate.

In this case, it is preferable that the EGR ratio control means be designed to calculate, as a target converted EGR ratio, a value corresponding to a ratio of the target EGR ratio to the target air flow rate, to calculate, as an actual converted EGR ratio, a value corresponding to a ratio of the actual EGR ratio to the actual air flow rate, and to control an opening of the EGR control valve such that the target converted EGR ratio becomes equal to the actual converted EGR ratio.

According to these constructions, as described above, a target converted EGR ratio SRtgt can be made to coincide with an actual converted EGR ratio SRact. As a result, the intake-air oxygen concentration "x" assumes a desired value, whereby it becomes possible to effectively reduce a discharge amount of NOx.

In addition, if each side of each of the aforementioned expressions (9) and (10) is multiplied by an actual air flow rate Gn, expressions (11) and (12) shown below are obtained.

[Expression 11]

$$SRhtgt \times Gn = Rtgt \times Gn/Gntgt \quad (11)$$

[Expression 12]

$$SRhact \times Gn = Ract \quad (12)$$

As is apparent from the aforementioned expressions (11) and (12), in order for the target converted EGR ratio SRtgt to coincide with the actual converted EGR ratio SRact (i.e., in order for a post-conversion target converted EGR ratio SRhtgt to coincide with a post-conversion actual converted EGR ratio SRhact), it is appropriate that the right side of the expression (11) be equal to the right side of the expression (12) (i.e., the actual EGR ratio Ract). It is to be noted in the present specification that the left side SRhtgt×Gn of the aforementioned expression (11) is referred to as a "control target EGR ratio Rctgt".

In view of the foregoing, it is preferable that the EGR ratio control means be designed to calculate, as a control target EGR ratio, a value obtained by multiplying a target converted EGR ratio determined in accordance with a ratio of the target EGR ratio to the target air flow rate by the actual air flow rate, and to control an opening of the EGR control valve such that the control target EGR ratio becomes equal to the actual EGR ratio.

This construction also makes it possible to make a target converted EGR ratio SRtgt coincident with an actual converted EGR ratio SRact and hence to effectively reduce a discharge amount of NOx while ensuring a desired intake-air oxygen concentration "x".

According to the EGR control device of the aforementioned invention, it is preferable that the target EGR ratio Rtgt be determined such that the intake-air oxygen concentration "x", which greatly influences a discharge amount of NOx, assumes a desired value. However, if the target EGR ratio Rtgt is thus determined, the EGR control valve is so controlled as to ensure a predetermined EGR ratio even in a region where the actual air flow rate Gn is relatively low, for example, as in the case where there is a delay in supercharging as in an initial acceleration period of an internal combustion engine equipped with a supercharger, or as in the case where there is a low atmospheric pressure. Therefore, the actual air flow rate Gn may become excessively low to the extent of increasing a generation amount of so-called smoke.

Thus, it is preferable that the target EGR ratio determination means be designed to determine a target EGR ratio for controlling intake-air oxygen concentration and intending to obtain such an intake-air oxygen concentration as will suppress generation of nitrogen oxides, to calculate a critical target EGR ratio for suppressing generation of smoke or particulate matters, and to determine the lower one of the target EGR ratio for controlling intake-air oxygen concentration and the critical target EGR ratio as the target EGR ratio. Now, if the target EGR ratio for controlling intake-air oxygen concentration and intending to obtain such an intake-air oxygen concentration as will suppress generation of NOx is defined as a target EGR ratio RO2tgt for controlling intake-air oxygen concentration while an air flow rate for obtaining this target EGR ratio RO2tgt for controlling intake-air oxygen concentration is denoted by Gn02, an expression (13) shown below is obtained.

[Expression 13]

$$RO2tgt=(Gcyl-Gn02)/Gcyl \quad (13)$$

Given an injection amount of an arbitrary constant, a minimum dischargeable amount (a permissible amount) of smoke (or particulate matters) is determined in advance, and a minimum air flow rate for preventing a generation amount of smoke from reaching or exceeding the amount that has been determined for the injection amount of the arbitrary constant is defined as Gnmin. In this case, the amount of smoke reaches the permissible amount when the air flow rate Gn becomes extremely low. Thus, the air flow rate Gn02 for obtaining the target EGR ratio RO2tgt for controlling intake-air oxygen concentration for the constant injection amount becomes higher than the minimum air flow rate Gnmin. In this case, a critical target EGR ratio RSMtgt for suppressing generation of smoke (a target EGR ratio for suppressing generation of smoke) is expressed by an expression (14) shown below.

[Expression 14]

$$RSMtgt=(Gcyl-Gnmin)/Gcyl \quad (14)$$

Then, a target EGR ratio Rtgt for controlling the EGR control valve (an EGR ratio) is finally determined by an expression (15) shown below. In the expression (15), min(α, β) represents a function of selecting the smaller one of values α and β.

[Expression 15]

$$Rtgt=\min(RO2tgt, RSMtgt) \quad (15)$$

As a result, if the target EGR ratio RO2tgt for controlling intake-air oxygen concentration is lower than the critical target EGR ratio RSMtgt (RO2tgt<RSMtgt), there is established a relationship Rtgt=RO2tgt according to the aforementioned expression (15). By controlling the EGR control valve, the actual air flow rate Gn becomes equal to Gn02 (Gn=Gn02). Accordingly, an expression (16) shown below is obtained.

[Expression 16]

$$Gnmin<Gn02=Gn \quad (16)$$

On the other hand, if the target EGR ratio RO2tgt for controlling intake-air oxygen concentration is equal to or higher than the critical target EGR ratio RSMtgt (RO2tgt≦RSMtgt), there is established a relationship Rtgt=RSMtgt according to the aforementioned expression (15). By controlling the EGR control valve, the actual air flow rate Gn becomes equal to the minimum air flow rate Gnmin. Accordingly, an expression (17) shown below is obtained.

[Expression 17]

$$Gnmin=Gn \quad (17)$$

Based on the foregoing description, if the lower one of the target EGR ratio RO2tgt for controlling intake-air oxygen concentration and the critical target EGR ratio RSMtgt is determined as the target EGR ratio as in the construction mentioned above, the actual air flow rate Gn becomes equal to or higher than the minimum air flow rate Gnmin. Therefore, the generation amount of smoke (or particulate matters) can be inhibited from exceeding the permissible amount.

DETAILED DESCRIPTION OF THE PREFERRED EMBODIMENTS

Figure 1:
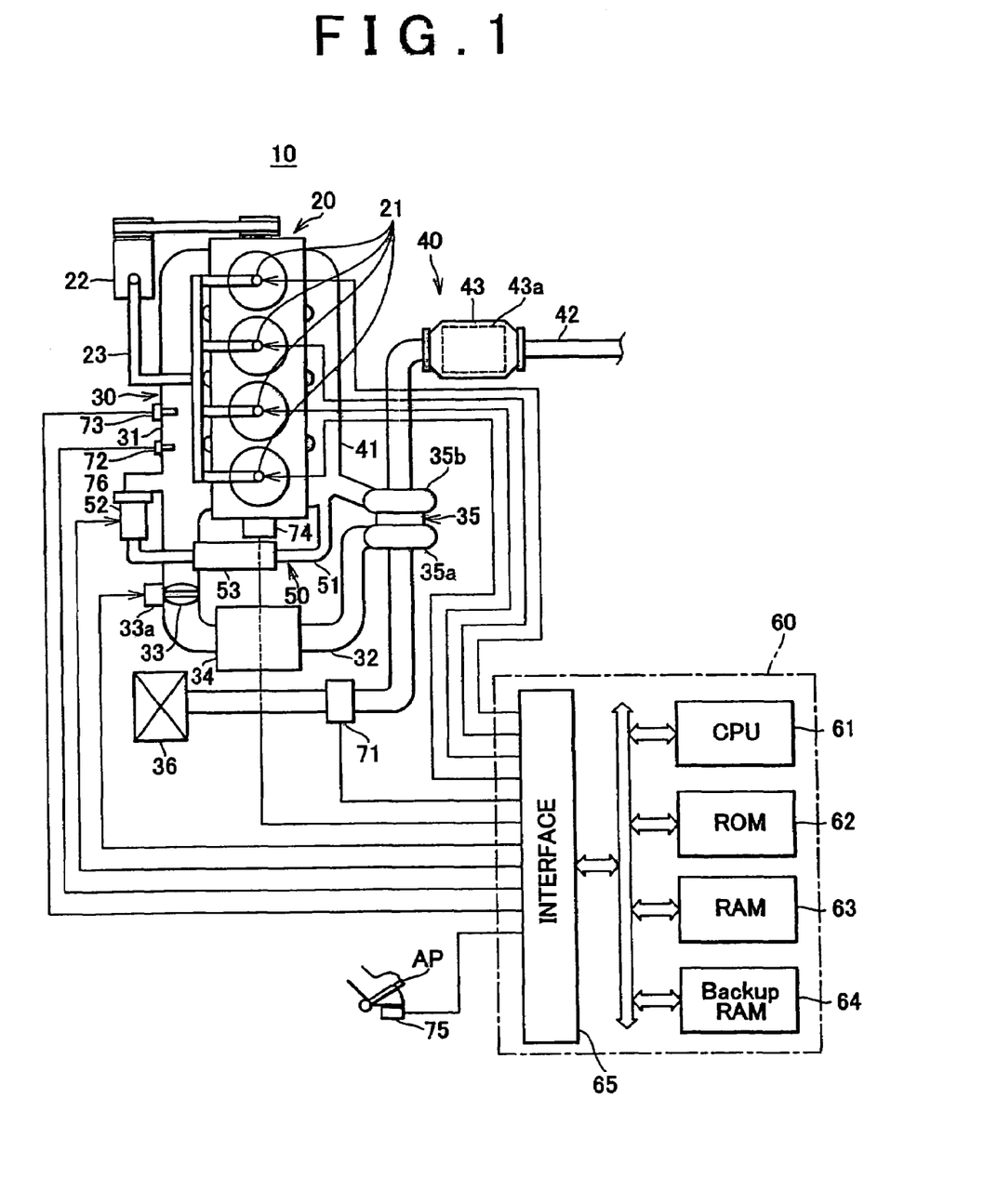
FIG. 1 is a schematic structural view of an entire system in which an EGR control device in accordance with a first embodiment of the invention is applied to a four-cylinder internal combustion engine (a diesel engine).

Hereinafter, the respective embodiments of an EGR control device for an internal combustion engine (a diesel engine) in accordance with the invention will be described with reference to the drawings. FIG. 1 is a schematic structural view of an entire system in which the EGR control device (an exhaust gas purifying device for an internal combustion engine) in accordance with the first embodiment of the invention is applied to a four-cylinder internal combustion engine (a diesel engine) 10. This system includes an engine body 20 including a fuel supplying system, an intake system 30 for introducing gas into combustion chambers formed respectively in cylinders of the engine body 20, an exhaust system 40 for discharging exhaust gas from the engine body 20, an EGR unit 50 for recirculating exhaust gas, and an electronic control unit 60.

Each of fuel injection valves (injection valves or injectors) 21 is disposed in an upper portion of a corresponding one of the cylinders of the engine body 20. The fuel injection valves 21 are connected to a fuel injection pump 22 via a fuel line 23. The fuel injection pump 22 is connected to a fuel tank (not shown). Thus, fuel that has been pressurized up to an injection pressure is supplied to the fuel injection valves 21 from the fuel injection pump 22. Also, the fuel injection valves 21 are electrically connected to the electronic control unit 60. Upon receiving a drive signal (a command signal corresponding to a command injection amount Qfin) from the electronic control unit 60, the fuel injection valves 21 are held open for a predetermined period. Thus, the pressurized fuel is injected into the combustion chambers formed respectively in the cylinders.

The intake system 30 includes an intake manifold 31, an intake pipe 32, a throttle valve 38, a throttle valve actuator 33a, an intercooler 34, a compressor 35a of a supercharger 35, and an air cleaner 36. The intake manifold 31 is connected to the combustion chambers formed respectively in the cylinders of the engine body 20. The intake pipe 32 is connected to an upstream-side collective portion of the intake manifold 31. The intake pipe 32 and the intake manifold 31 constitute an intake passage. The throttle valve 38 is rotatably held in the intake pipe 32. The throttle valve actuator 33a rotatably drives the throttle valve 33 in response to a drive signal transmitted from the electronic control unit 60. The intercooler 34 and the compressor 35a of the supercharger 35 are disposed in this order along the intake pipe 32 in a region upstream of the throttle valve 33. The air cleaner 36 is disposed at a tip end portion of the intake pipe 32.

The exhaust system 40 includes an exhaust manifold 41, an exhaust pipe 42, a turbine 35b of the supercharger 35, and a diesel particulate filter (hereinafter referred to as a "DPNR") 43. The exhaust manifold 41 is connected to the cylinders of the engine body 20. The exhaust pipe 42 is connected to a downstream-side collective portion of the exhaust manifold 41. The turbine 35b of the supercharger 35 is disposed in the exhaust pipe 42. The exhaust pipe 42 extends across the DPNR 43. The exhaust manifold 41 and the exhaust pipe 42 constitute an exhaust passage.

The DPNR 43 is provided with a filter 43a that is made of a porous material such as cordierite or the like. Particulates contained in exhaust gas flowing through the filter 43a are collected on surfaces of pores formed in the filter 43a. The DPNR 43 includes alumina as a carrier. At least one material selected from an alkali metal such as potassium K, sodium Na, lithium Li, and cesium Cs, an alkali earth metal such as barium Ba and calcium Ca, and a rare earth metal such as lanthanum La and yttrium Y is carried on the carrier. Platinum is carried on the carrier as well. The DPNR 43 also functions as an occlusion-reduction-type NOx catalyst. After having absorbed NOx, the occlusion-reduction-type NOx catalyst discharges and reduces the absorbed NOx.

The EGR unit 50 is provided with an exhaust gas recirculation pipe 51, an EGR control valve 52, and an EGR cooler 53. The exhaust gas recirculation pipe 51 constitutes a passage (an EGR passage) through which exhaust gas is recirculated. The exhaust gas recirculation pipe 51 extends across the EGR valve 52. The exhaust passage communicates in a region upstream of the turbine 35b (the exhaust manifold 41) with the intake passage in a region downstream of the throttle valve 33 (the intake manifold 31), through the exhaust gas recirculation pipe 51. In response to a drive signal transmitted from the electronic control unit 60, the EGR control valve 52 changes an amount of exhaust gas to be recirculated (an exhaust gas recirculation amount or an EGR gas flow rate), and controls an EGR ratio as will be described later.

The electronic control unit 60 is a microcomputer composed of a CPU 61, a ROM 62, a RAM 63, a back-up RAM 64, an interface 65, and the like, which are interconnected by a bus. Programs executed by the CPU 61, tables (look-up tables and maps), constants, and the like are stored in the ROM 62 in advance. The CPU 61 temporarily stores data into the RAM 63 if the necessity arises. The back-up RAM 64 stores data when a power source is on, and holds the stored data even while the power source is off. The interface 65 includes an AD converter.

The interface 65 is connected to a hot-wire air flow meter 71, an intake air temperature sensor 72, an intake pipe pressure sensor 73, an engine rotational speed sensor 74, and an accelerator opening sensor 75. The hot-wire air flow meter 71, which is air flow rate (fresh air flow rate) measurement means, is disposed in the intake pipe 32. The intake air temperature sensor 72 is provided in the intake passage at a position downstream of the throttle valve 33. The intake pipe pressure sensor 73 is disposed in the intake passage at a position downstream of the throttle valve 33 and downstream of a region to which the exhaust gas recirculation pipe 51 is connected. Signals transmitted from these sensors are supplied to the CPU 61. The interface 65 is connected to the fuel injection valves 21, the throttle valve actuator 33a, and the EGR control valve 52. In accordance with a command of the CPU 61, the interface 65 delivers drive signals to those components.

The hot-wire air flow meter 71 measures a mass flow rate of intake air (an amount of intake air per unit time or an amount of fresh air per unit time) flowing through the intake passage, and generates a signal Gn (an air flow rate Gn) indicating the mass flow rate. The intake air temperature sensor 72 detects a temperature of gas (i.e., an intake air temperature) sucked into the cylinders (i.e., the combustion chambers) of the engine 10, and generates a signal THA indicating the intake air temperature. The intake pipe pressure sensor 73 generates a signal PM (an intake pipe pressure PM) indicating a pressure in the intake passage at a position downstream of the throttle valve 33 and the EGR control valve 52.

The engine rotational speed sensor 74 detects a rotational speed of the engine 10, generates a signal indicating an engine rotational speed NE, and can detect an absolute crank angle of each of the cylinders. The accelerator opening sensor 75 detects an operation amount of an accelerator pedal AP and generates a signal Accp indicating an accelerator operation amount.

Next, operation of the EGR control device constructed as described above will be described. The CPU 61 of the electronic control unit 60 repeatedly executes a program shown in the flowchart of FIG. 2 every time a predetermined period elapses. Thus, at predetermined timings, the CPU 61 starts performing processings in a step 200. In a step 205, the CPU 61 fetches (acquires) operational state quantities of the engine such as an engine rotational speed NE, an accelerator operation amount Accp, an actual air flow rate Gn, an intake pipe pressure PM, an intake air temperature THA, and the like, from the aforementioned various sensors.

Figure 2:
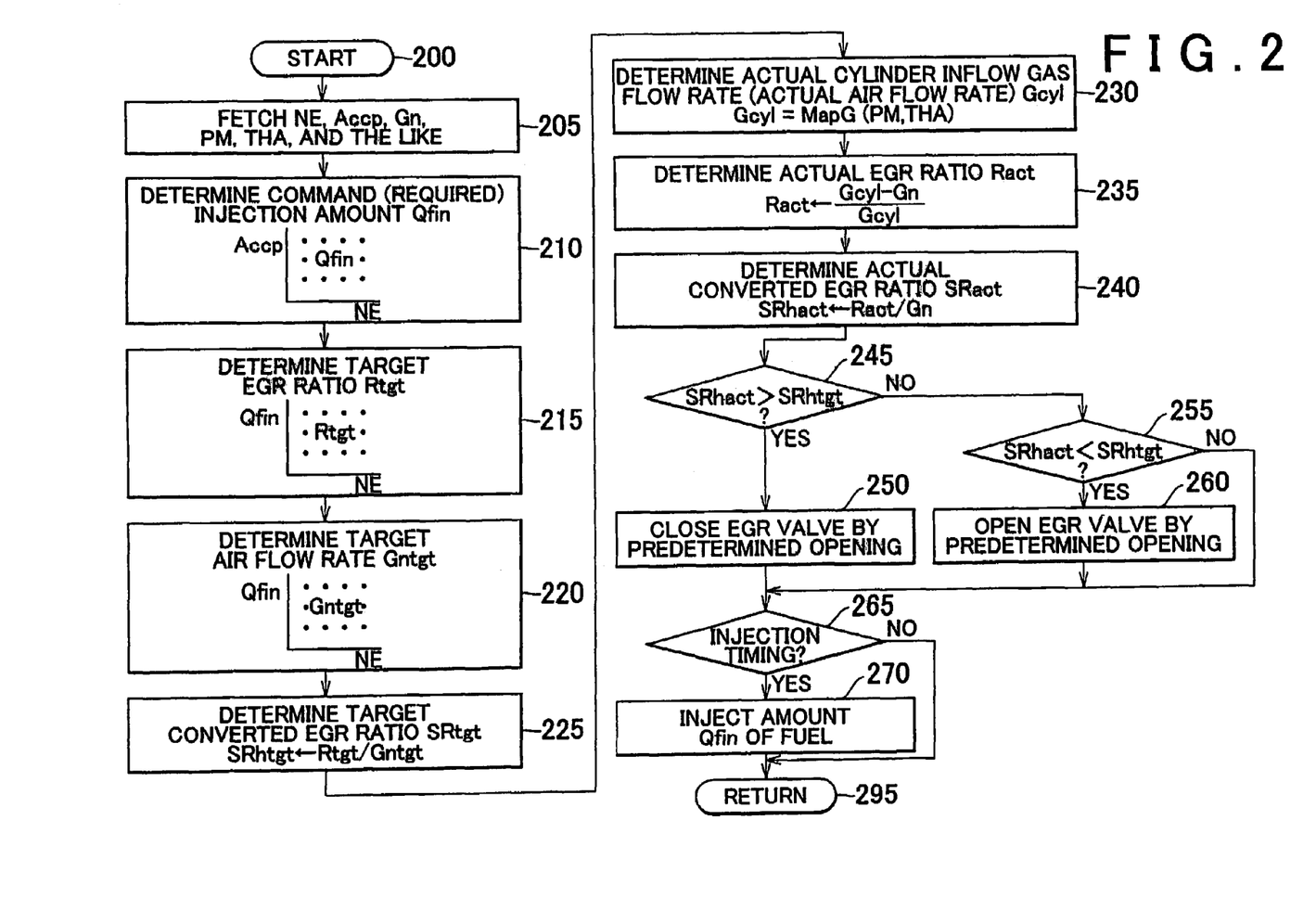
FIG. 2 is a flowchart showing a program that is executed by a CPU shown in FIG. 1.

The CPU 61 then proceeds to a step 210 and determines a command injection amount Qfin (an amount of fuel to be injected or a required fuel injection amount) at that moment on the basis of a map defining a relationship between accelerator operation amount Accp and engine rotational speed NE as engine operational state quantities on one hand and command injection amount Qfin on the other hand, and on the basis of the actual accelerator operation amount Accp fetched in the step 205 and the actual engine rotational speed NE fetched in the step 205.

The CPU 61 then determines a target EGR ratio Rtgt on the basis of a map defining a relationship between command injection amount Qfin and engine rotational speed NE as engine operational state quantities on one hand and target EGR ratio Rtgt on the other hand, and on the basis of the actual command injection amount Qfin acquired in the step 210 and the actual engine rotational speed NE fetched in the step 205. Then in a step 220, the CPU 61 determines a target air flow rate Gntgt on the basis of a map defining a relationship between command injection amount Qfin and engine rotational speed NE on one hand and target air flow rate Gntgt on the other hand, and on the basis of the aforementioned command injection amount Qfin and the aforementioned actual engine rotational speed NE.

The CPU 61 then proceeds to a step 225. In this step, the CPU 61 determines a (post-conversion) target converted EGR ratio SRhtgt from the target EGR ratio Rtgt acquired in the step 215 and the target air flow rate Gntgt acquired in the step 220, on the basis of the aforementioned expression (9). The target conversion EGR ratio SRhtgt is determined such that a predetermined intake-air oxygen concentration "x" for reducing a discharge amount of NOx is obtained. In other words, the maps used in the steps 215 and 220 are so determined as to obtain a target converted EGR ratio SRhtgt, which is determined such that a predetermined intake-air oxygen concentration "x" for reducing a discharge amount of NOx is obtained. Then in a step 230, the CPU 61 determines a cylinder inflow gas flow rate Gcyl on the basis of a map defining a relationship between intake pipe pressure PM and intake air temperature THA as engine operational state quantities on one hand and cylinder inflow gas flow rate Gcyl on the other hand, and on the basis of the actual intake pipe pressure PM fetched in the step 205 and the actual intake air temperature THA fetched in the step 205.

Then in a step 235, the CPU 61 calculates and determines an actual EGR ratio Ract from the aforementioned cylinder inflow gas flow rate Gcyl, the actual air flow rate Gn fetched in the step 205, and the aforementioned expression (4). In a step 240, the CPU 61 determines an (post-conversion) actual converted EGR ratio SRhact from the actual EGR ratio Ract calculated in the step 240, the fetched actual air flow rate Gn, and the aforementioned expression (10).

The CPU 61 then determines in a step 245 whether or not the actual converted EGR ratio SRhact calculated in the step 240 is higher than the target converted EGR ratio SRhtgt calculated in the step 225. If the result of the determination in the step 245 is "Yes", the CPU 61 proceeds to a step 250, causes the EGR control valve 52 to close by a predetermined opening so as to reduce an EGR ratio, and then proceeds to a step 265. On the other hand, if the result of the determination in the step 245 is "No", the CPU 61 proceeds to the step 255 and determines whether or not the actual converted EGR ratio SRhact is lower than the target converted EGR ratio SRhtgt. If the result of the determination in the step 255 is "Yes", the CPU 61 proceeds to a step 260, causes the EGR control valve 52 to open by a predetermined opening so as to increase an EGR ratio, and then proceeds to a step 265. If the result of the determination in the step 255 is "No", the CPU 61 directly proceeds to the step 265.

The CPU 61 then determines in the step 265 whether or not fuel is to be injected at the moment. If fuel is to be injected at the moment, the CPU 61 ensures that the command injection amount Qfin of fuel calculated in the step 210 is injected from a corresponding one of the fuel injection valves 21 of at least one of the cylinders from which fuel is to be injected, and temporarily terminates the present routine in a step 295. If the result of the determination in the step 265 is "No", the CPU 61 directly proceeds to the step 295 and temporarily terminates the present routine.

As described hitherto, according to the first embodiment of the invention, an opening of the EGR control valve 52 is controlled such that an actual converted EGR ratio SRhact coincides with a target converted EGR ratio SRhtgt, whereby an EGR ratio is changed. In this case, the actual converted EGR ratio SRhact and the target converted EGR ratio SRhtgt are calculated without using a command injection amount Qfin. Therefore, even if the command injection amount Qfin of fuel is not injected from the fuel injection valves 21, a true value of the actual converted EGR ratio SRhact is precisely calculated. Thus, the intake-air oxygen concentration "x" can be so controlled with high precision as to become equal to a desired value. Therefore, it is possible to reduce a discharge amount of NOx.

Next, the EGR control device in accordance with the second embodiment of the invention will be described. This EGR control device is different from the EGR control device of the aforementioned first embodiment only in that the CPU 61 executes a program shown in FIG. 3 instead of the program shown in FIG. 2. Accordingly, the following description will focus on the difference.

Figure 3:
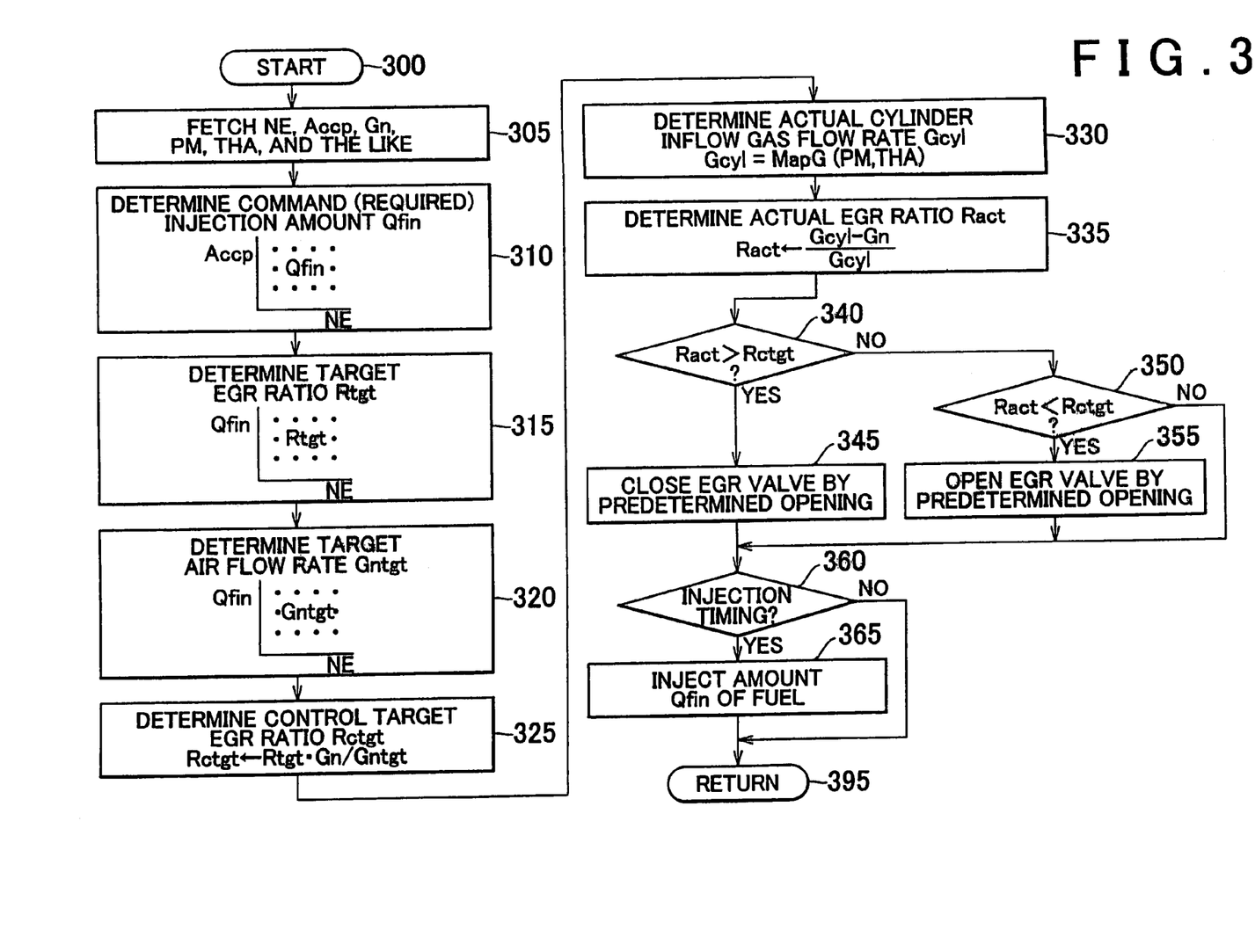
FIG. 3 is a flowchart showing a program that is executed by a CPU of an EGR control device in accordance with a second embodiment of the invention.

The CPU 61 repeatedly executes the program shown in FIG. 3 every time a predetermined period elapses. Thus, at predetermined timings, the CPU 61 performs processings in steps 305 to 320 following a step 300, and determines a command injection amount Qfin, a target EGR ratio Rtgt, and a target air flow rate Gntgt. The steps 305 to 320 are the same as the aforementioned steps 205 to 220 respectively and thus will not be described in detail.

The CPU 61 then proceeds to a step 325 and determines a control target EGR ratio Rctgt on the basis of the aforementioned expression (11). The CPU 61 then proceeds to a step 330 where the same processing as in the step 230 is performed, and determines a cylinder inflow gas flow rate Gcyl. Also, the CPU 61 calculates an actual EGR ratio Ract in a step 335 where the same processing as in the step 235 is performed.

The CPU 61 then determines in a step 340 whether or not the actual EGR ratio Ract calculated in the step 335 is higher than the control target EGR ratio Rctgt calculated in the step 325. If the result of the determination in the step 340 is "Yes", the CPU 11 proceeds to a step 345, causes the EGR control valve 52 to close by a predetermined opening so as to reduce an EGR ratio, and proceeds to a step 360. On the other hand, if the result of the step 340 is "No", the CPU 61 proceeds to a step 350 and determines whether or not the actual EGR ratio Ract is lower than the control target EGR ratio Rctgt. If the result of the step 350 is "Yes", the CPU 61 proceeds to a step 355, causes the EGR control valve 52 to open by a predetermined opening so as to increase an EGR ratio, and proceeds to the step 360. If the result of the determination in the step 350 is "No", the CPU 61 directly proceeds to the step 360.

The CPU 61 then determines in the step 360 whether or not fuel is to be injected at the moment. If fuel is to be injected at the moment, the CPU 61 ensures in a step 365 that the command injection amount Qfin of fuel calculated in the step 310 is injected from a corresponding one of the fuel injection valves 21 of at least one of the cylinders from which fuel is to be injected, and temporarily terminates the present routine in a step 395. If the result of the determination in the step 360 is "No", the CPU 61 directly proceeds to the step 395 and temporarily terminates the present routine.

As described hitherto, according to the second embodiment of the invention, an opening of the EGR control valve 52 is controlled such that an actual EGR ratio Ract coincides with a control target EGR ratio Rctgt, whereby an EGR ratio is changed. In this case, the actual EGR ratio Ract and the control target EGR ratio Rctgt are calculated without using a command injection amount Qfin. Therefore, even if the command injection amount Qfin of fuel is not injected from the fuel injection valves 21, a true value of the EGR ratio Ract is made to coincide precisely with the control target EGR ratio Rctgt. As a result, the intake-air oxygen concentration "x" is so controlled with high precision as to become equal to a desired value. Therefore, it is possible to reduce a discharge amount of NOx.

The target converted EGR ratio SRhtgt and the actual converted EGR ratio SRhact that are used in the control of the first embodiment are hard to recognize as physical quantities, whereas the control target EGR ratio and the actual EGR ratio that are used in the second embodiment are quantities that are physically easy to grasp. Namely, the control of the second embodiment is designed as follows. In order to make an intake-air oxygen concentration "x" constant for a target EGR ratio that has been determined in a circumstance with a constant engine rotational speed and a constant injection amount (i.e., with a constant cylinder inflow gas flow rate Gcyl), an EGR ratio is reduced in the case where an actual air flow rate is lower than a target air flow rate in a similar circumstance with a constant engine rotational speed and a constant injection amount, whereas an EGR ratio is increased in the case where an actual air flow rate is higher than the target air flow rate. Therefore, various control constants of the engine can be adapted easily.

Next, the EGR control device in accordance with the third embodiment of the invention will be described. This EGR control device is different from the EGR control device of the second embodiment only in that the CPU 61 performs processings in steps 405 to 420 shown in the flowchart of FIG. 4 instead of the processing in the step 315 of FIG. 3, which is performed by the CPU 61 of the aforementioned second embodiment. Accordingly, the following description will focus on the difference.

Figure 4:
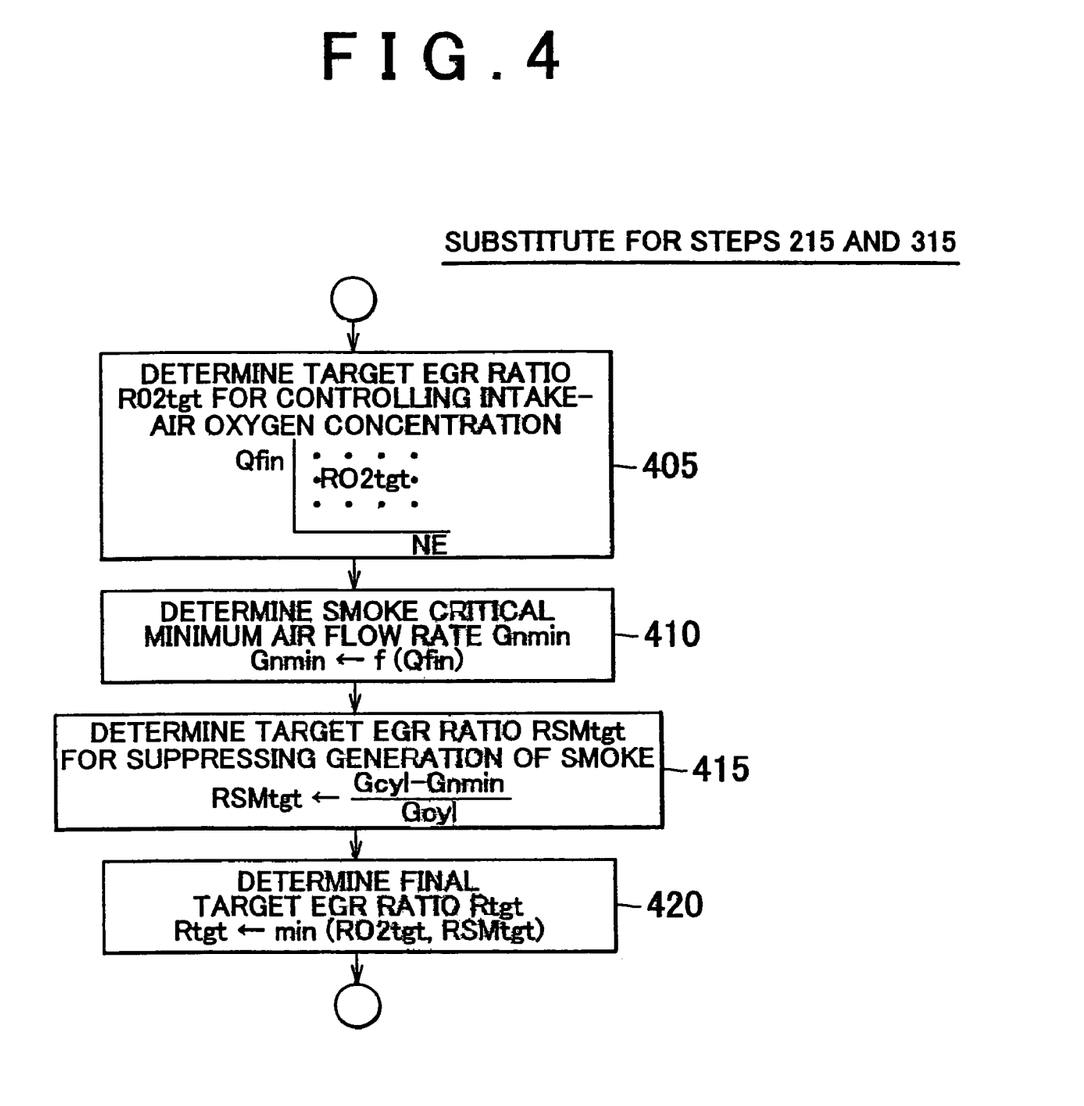
FIG. 4 is a flowchart showing a program that is executed by a CPU of an EGR control device in accordance with a third embodiment of the invention.

After having finished the processing in the step 310 shown in FIG. 3 at a predetermined timing, the CPU 61 in accordance with the third embodiment proceeds to a step 405 shown in FIG. 4, and determines a target EGR ratio RO2tgt for controlling intake-air oxygen concentration and obtaining such an intake-air oxygen concentration as will suppress generation of NOx in the step 405. The target EGR ratio RO2tgt for controlling intake-air oxygen concentration is determined from a map defining a relationship between command injection amount Qfin and engine rotational speed NE on one hand and target EGR ratio RO2tgt on the other hand, and from a current command injection amount Qfin calculated in the step 310 and a current actual engine rotational speed NE.

The CPU 61 then proceeds to a step 410 and determines a minimum value (a minimum air flow rate) Gnmin of an air flow rate required for making an amount of smoke or particulate matters equal to or smaller than a predetermined amount (a predetermined permissible amount) for the command injection amount Qfin, on the basis of the command injection amount Qfin. The CPU 61 then calculates a target EGR ratio RSMtgt for suppressing generation of smoke (or for suppressing generation of particulate matters) according to the aforementioned expression (14) in a step 415. In a step 420, the CPU 61 determines and adopts the lower one of the target EGR ratio (a critical target EGR ratio) RO2tgt for controlling intake-air oxygen concentration and the target EGR ratio RSMtgt for suppressing generation of smoke, as a final target EGR ratio Rtgt.

The CPU 61 thereafter performs the processings in the steps 320 to 395 of FIG. 3, and controls the EGR control valve 52 such that an actual EGR ratio Ract coincides with a control target EGR ratio Rctgt (see the step 325) that has been determined in accordance with the final target EGR ratio Rtgt.

Consequently, as described above, an actual air flow rate Gn is equal to or higher than a minimum air flow rate Gnmin that is determined in accordance with a command injection amount Qfin. Therefore, it is possible to reduce a discharge amount of NOx while reducing an amount of smoke to a permissible amount or less.

As described hitherto, the EGR control device for the internal combustion engine in accordance with each of the embodiments of the EGR control device makes it possible to reduce a discharge amount of NOx. It is to be noted herein that the invention is not limited to the aforementioned embodiments and that various modification examples can be adopted within the scope of the invention. For instance, the third embodiment can be used in combination with the first embodiment. That is, it is possible to adopt a construction in which the processings in the steps 405 to 420 of FIG. 4 are performed instead of the processing in the step 215 of FIG. 2.

The invention claimed is:

1. An EGR control device for an internal combustion engine comprising:
   an EGR passage through which an exhaust passage and an intake passage of the internal combustion engine communicate with each other;
   an EGR control valve across which the EGR passage extends and which controls a flow rate of EGR gas flowing from the exhaust passage to the intake passage; and
   an EGR controller that:
   acquires an operational state quantity of the engine;
   determines, on the basis of the detected operational state quantity, a target value of an EGR ratio, namely, a ratio of a flow rate of EGR gas sucked by the engine to a flow rate of gas sucked by the engine, as a target EGR ratio;
   determines, on the basis of the detected operational state quantity, a target value of a flow rate of air sucked by the engine, as a target air flow rate;
   acquires a true EGR ratio on the basis of the detected operational state quantity, as an actual EGR ratio;

acquires, on the basis of the detected operational state quantity, an actual flow rate of air sucked by the engine, as an actual air flow rate; and defines a target converted EGR ratio as a value corresponding to a ratio of the target EGR ratio to a target excessiveness ratio as being a ratio of the target air flow rate to a command injection amount, and an actual converted EGR ratio as a value corresponding to a ratio of the actual EGR ratio to an actual excessiveness ratio as being a ratio of the actual air flow rate to the command injection amount, and controls an actual EGR ratio by controlling an opening of the EGR control valve in accordance with the converted actual EGR ratio and the target converted EGR ratio.

2. The EGR control device according to claim 1, wherein the EGR calculates, as a control target EGR ratio, a value obtained by multiplying the target converted EGR ratio by the actual air flow rate, and controls an opening of the EGR control valve such that the control target EGR ratio becomes equal to the actual EGR ratio.

3. The EGR control device according to claim 1, wherein the controller determines a target EGR ratio from a command fuel injection amount and an engine rotational speed.

4. The EGR control device according to claim 1, wherein the controller determines a target air flow rate from a command fuel injection amount and an engine rotational speed.

5. The EGR control device according to claim 1, wherein the controller determines an actual EGR ratio from a cylinder inflow gas flow rate and an actual air flow rate.

6. The EGR control device according to claim 1, wherein the controller acquires an actual air flow rate from an air flow meter.

7. The EGR control device according to claim 1, wherein the controller determines a target EGR ratio for controlling intake-air oxygen concentration and obtaining such an intake-air oxygen concentration as will suppress generation of nitrogen oxides, calculates a critical target EGR ratio for suppressing generation of smoke or particulate matters, and determines the lower one of the target EGR ratio for controlling intake-air oxygen concentration and the critical target EGR ratio as the target EGR ratio.

8. The EGR control device according to claim 7, wherein the EGR ratio for controlling intake-air oxygen concentration is determined from a command fuel injection amount and an engine rotational speed.

9. The EGR control device according to claim 7, wherein the critical target EGR ratio is determined from a cylinder inflow gas amount and a smoke critical minimum air flow rate.

10. An EGR control method for an internal combustion engine provided with an EGR passage through which an exhaust passage and an intake passage of the internal combustion engine communicate with each other, and with an EGR control valve across which the EGR passage extends and which controls a flow rate of EGR gas flowing from the exhaust passage to the intake passage, comprising the steps of:

acquiring an operational state quantity of the engine;

determining, on the basis of the detected operational state quantity, a target value of an EGR ratio, namely, a ratio of a flow rate of EGR gas sucked by the engine to a flow rate of gas sucked by the engine, as a target EGR ratio;

determining, on the basis of the detected operational state quantity, a target value of a flow rate of air sucked by the engine, as a target air flow rate;

acquiring a true EGR ratio on the basis of the detected operational state quantity, as an actual EGR ratio;

acquiring, on the basis of the detected operational state quantity, an actual flow rate of air sucked by the engine, as an actual air flow rate; and defining a target converted EGR ratio as a value corresponding to a ratio of the target EGR ratio to a target excessiveness ratio as being a ratio of the actual air flow rate to a command injection amount, and an actual converted EGR ratio as a value corresponding to a ratio of the actual EGR ratio to an actual excessiveness ratio as being a ratio of the actual air flow rate to the command injection amount, and controlling an actual EGR ratio by controlling an opening of the EGR control valve in accordance with the actual converted EGR ratio and the target converted EGR ratio.

11. The EGR control method according to claim 10, wherein the EGR ratio control calculates, as a control target EGR ratio, a value obtained by multiplying the target converted EGR ratio by the actual air flow rate, and controls an opening of the EGR control valve such that the control target EGR ratio becomes equal to the actual EGR ratio.

12. The EGR control method according to claim 10, wherein the determination of the target EGR ratio determines a target EGR ratio from a command fuel injection amount and an engine rotational speed.

13. The EGR control method according to claim 10, wherein the determination of the target air flow rate determines a target air flow rate from a command fuel injection amount and an engine rotational speed.

14. The EGR control method according to claim 10, wherein the acquisition of the actual EGR ratio determines an actual EGR ratio from a cylinder inflow gas flow rate and an actual air flow rate.

15. The EGR control method according to claim 10, wherein the acquisition of the actual air flow rate acquires an actual air flow rate from an air flow meter.

16. The EGR control method according to claim 10, wherein the determination of the target EGR ratio determines a target EGR ratio for controlling intake-air oxygen concentration and obtaining such an intake-air oxygen concentration as will suppress generation of nitrogen oxides, calculates a critical target EGR ratio for suppressing generation of smoke or particulate matters, and determines the lower one of the target EGR ratio for controlling intake-air oxygen concentration and the critical target EGR ratio as the target EGR ratio.

17. The EGR control method according to claim 16, wherein the EGR ratio for controlling intake-air oxygen concentration is determined from a command fuel injection amount and an engine rotational speed.

18. The EGR control method according to claim 16, wherein the critical target EGR ratio is determined from a cylinder inflow gas amount and a smoke critical minimum air flow rate.

* * * * *